United States Patent [19]

Nikomarov et al.

[11] 4,449,953
[45] May 22, 1984

[54] ARTICULATED COUPLING

[75] Inventors: Samuil S. Nikomarov; Anatoly M. Kochnev; Vladimir B. Goldobin; Jury M. Sarapulov, all of Perm; Isaak Y. Valdman, Kungur Permskoi, all of U.S.S.R.

[73] Assignee: Permsky Filial Vsesojuznogo Nauchno-Issledovatelskogo Instituta Burovoi Tekhniki, U.S.S.R.

[21] Appl. No.: 301,023

[22] Filed: Sep. 10, 1981

[30] Foreign Application Priority Data

Sep. 12, 1980 [SU] U.S.S.R. .............................. 2981886

[51] Int. Cl.³ .................. E21B 4/02; E21B 17/02
[52] U.S. Cl. ............................ 464/19; 175/107; 403/74; 403/121; 418/48; 464/147
[58] Field of Search ............... 464/7, 19, 114, 147, 464/153, 155, 160, 173, 183; 175/107, 320; 418/48; 403/73, 74, 121

[56] References Cited

U.S. PATENT DOCUMENTS

| 2,924,180 | 2/1960 | Bourke et al. | 418/48 |
| 3,231,029 | 1/1966 | Winberg | 464/19 X |
| 3,512,904 | 5/1970 | Allen | 418/48 |
| 3,539,279 | 11/1970 | Rider et al. | 418/48 |
| 3,822,972 | 7/1974 | Ogly et al. | 418/48 |
| 4,157,022 | 6/1979 | Crase | 464/19 X |
| 4,263,788 | 4/1981 | Beimgraben | 464/147 |

FOREIGN PATENT DOCUMENTS 2529915  1/1977  Fed. Rep. of Germany ...... 418/48

Primary Examiner—Stuart S. Levy
Assistant Examiner—Daniel P. Stodola
Attorney, Agent, or Firm—Steinberg & Raskin

[57] ABSTRACT

An articulated coupling has two cylindrical half-couplings facing each other at their end faces. Recesses are formed in the end faces which recesses in which a cage is installed in the recesses with a clearance. Radial coaxial openings are formed in the cage and the half-couplings and rollers are installed in the coaxial openings with clearances. The half-couplings are provided with a device for holding the rollers in the openings.

6 Claims, 6 Drawing Figures

ARTICULATED COUPLING

BACKGROUND OF THE INVENTION

The present invention relates to flexible couplings for transmitting rotation between angularly misaligned shafts. More particularly, the invention relates to articulated couplings.

The invention may be most suitably used in screw-type downhole motors for drilling boreholes as a unit for connecting a rotor moving in a gyratory path with a shaft of a supporting unit to which the drill bit is connected.

The invention may also be used in turbo-drills for controlled directional drilling, designed for changing the direction of a borehole in the process of drilling.

The invention may be used in other machines, for example, in screw-type pumps.

In the screw-type downhole motors and screw-type pumps, use is made of two articulated couplings connected one after the other, while in the turbo-drills for controlled directional drilling, use is made of one articulated coupling.

The use of articulated units in the downhole mechanisms is associated with transmission by these units of torque and axial thrust of great magnitude from a driving member to a driven member such as, for example, a drill bit. In screw-type downhole motors with multiple-start driving members torque amounts to 4000–5000 Nm while axial thrust amounts to 100–150 kN). Another feature in the use of articulated units resides in stringent limits imposed on their diametral dimensions because of the need for placing the downhole motor in a borehole.

Known in the prior art is a flexible coupling for a screw-type downhole motor, disclosed in U.S. Pat. No. 3,260,069. This coupling comprises upper and lower connectors with which are associated tubular segments provided with shaped lobes and lobe spaces due to which the lobe of one segment fits the lobe space of the adjacent segment with clearances. Disposed in the center hollow portion of the segments are spacing elements, each of which has a spherical socket in both end surfaces for accommodating a ball. From the outside the flexible coupling is enclosed in a boot of elastic material for retaining the lubricant in the flexible coupling. The upper and lower connectors are associated respectively with the rotor and the output shaft of a motor.

Transmission of torque by the flexible coupling is accomplished due to interaction of the lobes of the adjacent tubular segments, while axial thrust is transmitted through the spacing elements and the balls fitted in the sockets thereof.

Due to the presence of clearances between the lobes of the tubular segments the latter can be angularly displaced relative to one another, with the result that the coupling acquires the needed flexibility. However, when the flexible coupling is in operation the lobes of the tubular segments continuously slide one over another which under conditions of high unit loads at places of contact brings about friction losses and wear of these contacting surfaces.

In addition, sliding friction and wear are caused when axial thrust is transmitted through the spacing elements and the balls, as the surfaces of these elements are also engaged in sliding motion.

Also known in the prior art is an articulated coupling used for connecting the rotor and the output shaft of a screw-type downhole motor (U.S. Pat. No. 3,357,208), comprising an external half-coupling provided with internal teeth, an internal half-coupling provided with external teeth interacting with the internal teeth of the external half-coupling, a tube connecting the internal half-couplings with each other, a means for transmission of axial thrust, and seals. The means for transmission of axial thrust incorporates thrust bars secured in the external and internal half-couplings so that the point of contact of the thrust bars lies in the plane passing through the middle of the teeth.

Angular misalignment of the coupling is accomplished due to the backlash in the gearing of the half-couplings, through which transmission of torque is effected. Due to a continuous angular precessional motor of the coupling, transmission of torque through the surfaces of the teeth of the half-couplings is accomplished by their intensive sliding and wear of the contacting surfaces.

Besides, when the gearing operates wiht angularity, there exists an obvious nonuniform distribution of load over the teeth of the half-couplings, since the teeth which lie in a plane perpendicular to the plane of angularity are the most loaded. These teeth have an edge contact causing distortion and breakage thereof.

Another articulated coupling for downhole fluid motors has been known heretofore in the art (cf. U.S. Pat. No. 4,157,022), comprising two heads with yokes, and a center cross disposed therebetween. Pins pass through openings of the yokes and the center cross in a mutually perpendicular direction. One of the pins is solid and the other is constituted of two portions.

Transmission of torque is effected due to interaction of internal side surfaces of the yoke with external surfaces of the center cross and also due to interaction of the pins with surfaces of the openings in the yokes and the center cross. The aforedescribed coupling has a lubrication system with a lubricator which balances the pressure of lubricant in the joints and the pressure of fluid surrounding the joints.

A disadvantage of this articulated coupling resides in the fact that transmission of torque and axial thrust is effected through the surfaces of the elements engaged in a mutual relative sliding motion causing an excessive wear and reducing durability of the coupling.

There is also known an articulated coupling described in the book "Single-Screw Pumps" by Krylov A.V., Moscow, Publishing House "Gostoptekhizdat", 1962, p. 58, FIG. 41, in Russian. This coupling comprises two cylindrical half-couplings, a cage surrounding the half-couplings, and rollers. Formed in the external surfaces of the half-couplings and in the internal surface of the cage are longitudinal slots of cylindrical section, the axes thereof being parallel to the axes of the half-couplings and the cage. Cylindrical rollers are disposed in said slots between the half-couplings and the cage. Spherical sockets are formed in the end faces of the half-couplings and accomodate a thrust member whose ends are also spherical. Angular misalignment of the coupling results from the presence of clearances between the surfaces of walls of the slots and the rollers. Transmission of torque is effected due to interaction of the surfaces of the slots in the half-couplings and the cage with the rollers accommodated in the slots. Axial thrust is transmitted from one half-coupling to the other through the thrust member.

The main disadvantage, that is, a relative slip of the interacting surfaces, of the aforedescribed couplings is also characteristic of this articulated coupling. During the oscillatory (precessional) motion of the articulated coupling, the surfaces of the slots of the half-coupling slide over the surfaces of the rollers along the axes thereof, the path of sliding being defined by the magnitude of angular misalignment of the coupling and the distance from the axis of the half-coupling to the surface of the roller.

Another disadvantage of the known articulated coupling resides in the fact that under the action of a couple of oppositely directed forces exerted on the side of the driving and driven half-couplings, the rollers tend to turn so that their axes are angularly misaligned in relation to the axes of the slots in the half-couplings and the cage. The edge contact of the rollers with the surfaces of the slots resulting from this condition leads to rapid wear or breakage of the rollers. Due to these disadvantages the torque-transmitting capacity of the articulated coupling is substantially limited.

Besides, when said articulated coupling is in operation wedging out forces appear on the case, since the direction of forces acting at the place of contact of the roller with the surfaces of the slots is not coincident with the direction of the perpendicular to the radius, drawn to the point of contact.

SUMMARY OF THE INVENTION

The principal object of the present invention is to improve reliability and durability of an articulated coupling.

An object of the invention is to increase the load-carrying capacity of an articulated coupling in transmitting torque and axial thrust.

Another object of the invention is to provide an articulated coupling which is simple in structure and inexpensive to manufacture.

In accordance with the invention an articulated coupling comprises two cylindrical half-couplings kinematically associated with each other through rollers installed in a cylindrical cage. The end faces of the half-couplings facing each other are provided with recesses wherein the cage is installed with a clearance. Radial substantially coaxial openings are formed in the cage and the half-couplings and rollers are inserted in the openings with a clearance. The half-couplings being provided with a means for holding the rollers in the openings.

Radial arrangement of the rollers in the openings of the half-couplings and the cage, and the presence of clearances between the rollers and walls of the openings and between the cage and recesses of the half-couplings provide for angular misalignment of the half-couplings of the articulated coupling in connection of angularly misaligned shafts. In this case the angular oscillatory (precessional) movement of half-coupling relative to the other one is accomplished by a mutual relative rolling of the rollers over the walls of the openings in the cage and half-couplings, and is characterized by minimal friction losses.

The means for holding the rollers may suitably be a casing installed with a clearance from the outside of the half-couplings on elastic gaskets.

The presence of the clearance between the casing and the half-couplings, and elasticity of the gaskets on which the casing is installed, provide for angular elasticity of the articulated coupling and the installation of the casing on the elastic gaskets provides isolation of the internal space of the articulated coupling from the surrounding medium, precludes any leakage of lubricant and prevents abrasives, drilling fluid from getting thereinside.

The recess is preferably formed in the end face of each half-coupling in the form of a cylindrical annular groove having external and internal walls and the cage is in the form of a hollow cylinder with a clearance in the grooves of the half-couplings. The radial openings are formed, both in the external and internal walls of the grooves and the rollers are accommodated in both walls of the grooves and in the cage.

Due to such a constructional embodiment, angular misalignment of the rollers and transmission of torque-induced peripheral forces therethrough in the directions essentially coincident with the directions of perpendiculars to the places of contact, are precluded. Thus, the transmission of torque is accomplished under the best conditions of contact and each roller is symmetrically loaded and has three contact places.

Due to the presence of clearances the cage under load is self-aligned relative to the external and internal walls of the grooves, and the rollers are also self-aligned in the radial openings of the cage and the half-couplings. All this makes it possible to increase the load-carrying capacity of the articulated coupling, ensure its operation at transmission of torque of great magnitude and also to provide compactness and simplicity of its construction.

With regard to the fact that motion of the roller over the walls of the openings in the cage and half-couplings comes to rolling, the articulated coupling along with the high load-carrying capacity also features improved reliability and durability.

In another preferred embodiment of the articulated coupling, the recess in the end face of each half-coupling is formed so that an annular collar is formed over the periphery of the half-coupling, and annular grooves are formed in each end face of the cage, forming two walls between which the collars of the half-couplings are accommodated with a clearance. The radial openings are extended through both walls of the cage and the collar and the rollers installed in the radial openings rest on both walls of the grooves and on the collar.

This embodiment of the articulated coupling features all the advantageous qualities described heretofore.

Besides, this embodiment features additional qualities, such as improved flexibility of the coupling achieved at the expense of changing the configuration of the casing elastic gaskets, as the clearance between the internal surface of the casing and the external surface of the half-couplings is increased due to decrease in the outside diameter of the half-coupling, with the same overall diameter of the articulated coupling being retained without any decrease in the load-carrying capacity thereof.

The half-couplings may suitably be provided with means for transmitting axial thrust from one at the center areas of their end faces.

This permits the articulated coupling to be used in conditions where there is a need for a simultaneous transmission of torque and axial thrust between angularly misaligned shafts, for example, in screw-type downhole motors, screw-type pumps and in a turbodrill for controlled directional drilling.

It is preferred to provide the means for transmitting axial thrust from one half-coupling to the other one in the form of two contacting surfaces of the half-couplings, with at least one of these surfaces being spherical.

Such an embodiment of the constructing end surfaces of the half-couplings makes it possible to relieve the rollers from the action of axial thrust and to ensure the mutual rolling of the bearing surfaces of the half-couplings during their angular oscillatory movements.

It is advantageous to provide the means for transmitting axial thrust from one half-coupling to the other as an insert installed between the half-couplings. This simplifies manufacture of the articulated coupling.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

The invention will now be described in terms of specific embodiments thereof as applied to screw-type downhole motors and it is to be understood that such are merely illustrative and not restrictive. The present invention may also be used to advantage in screw-type pumps with a rotor moving in a gyratory path, and also in turbo-drills for controlled directional drilling.

Figure 1:
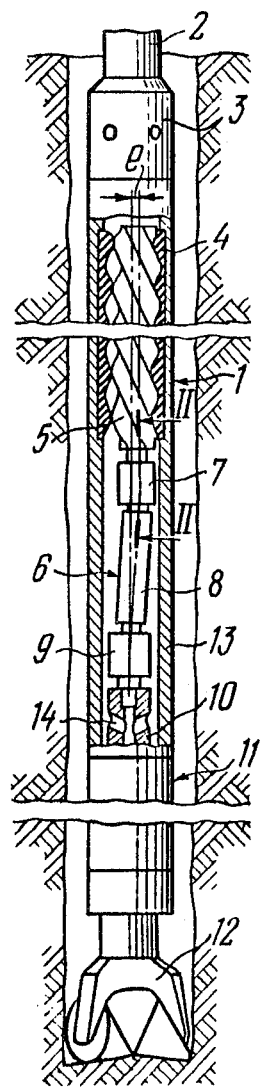
FIG. 1 is a schematic view, with a partial longitudinal section, showing a screw-type downhole motor incorporating articulated couplings according to the invention.

Referring now to FIG. 1, there is shown a screw-type downhole motor utilizing the articulated couplings of the invention. A screw-type downhole motor 1 is connected by its upper end to the lower end of a drilling string 2 which passes out to the ground surface. The motor comprises a by-pass valve 3 intended for passing a drilling fluid into and releasing it from the drilling string in the process of tripping operations. Connected to the body of the valve 3 is a stator 4 internally accommodating a rotor 5 whose axis is displaced relative to the stator axis in an eccentricity e. Associated with the lower end of the rotor 5 is a double-joint connection 6 incorporating an upper articulated coupling 7, a connecting rod 8 and a lower articulated coupling 9. Since the articulated couplings 7 and 9 are identical in construction, the construction of only one of them is described hereinafter.

The lower articulated coupling 9 is associated with the upper portions of a hollow shaft 10 of a supporting unit 11 which is provided with means for taking up axial thrust and radial load occuring during operation of the motor in the process of drilling a borehole. A drill bit 12 is secured to the lower end of the shaft 10.

The motor operates in the following manner.

The drilling fluid delivered by the pump from the ground surface through the drilling string 2, passes through the interior of the valve 3, enters the clearance between the rotor 5 and the stator 4 and rotates said rotor. From the lower portion of the stator 4 the drilling fluid flows into a clearance between a housing 13 of the motor and the double-joint connection 6, and then passes through an opening 14 into the internal space of the shaft 10 and then enters the bottom hole through the drill bit 12. The drilling fluid is returned from the bottom hole to the ground surface through an annular space between the external surface of the drilling string 2 and the wall of a borehole.

It should be noted that during operation of the screw-type motor 1 its rotor 5 is constantly displaced relative to the axis of the stator 4 and moves in a gyratory path, while the shaft 10 of the motor rotates in the supporting unit 11 concentrically in relation to the common axis of the motor and said stator.

Gyratory motion of the rotor 5 is converted into concentric rotation of the shaft 10 at the expense of using the double-joint connection 6, incorporating the articulated couplings 7 and 9 of the invention. The articulated couplings 7 and 9 transmit torque and axial trust resulting from the pressure of fluid acting on the rotor 5.

Figure 2:
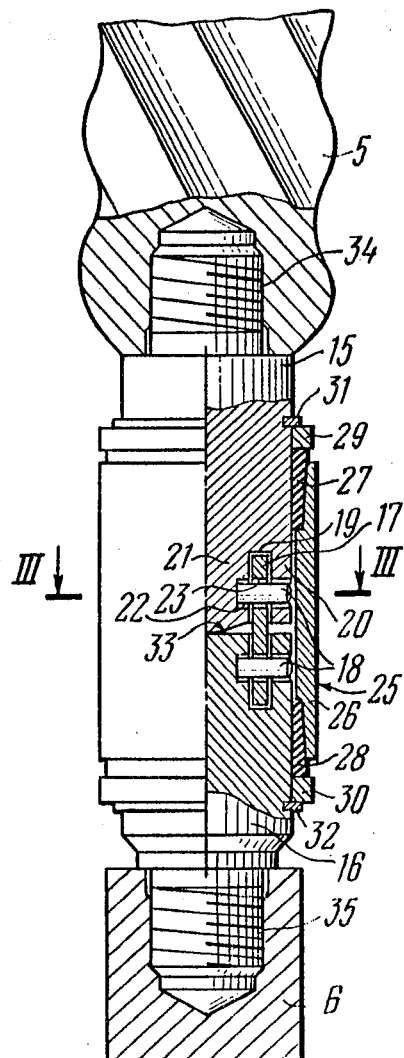
FIG. 2 is a partial longitudinal sectional view, on an enlarged scale taken along the lines II—II of FIG. 1, showing an embodiment of the articulated coupling of the invention.
Figure 3:
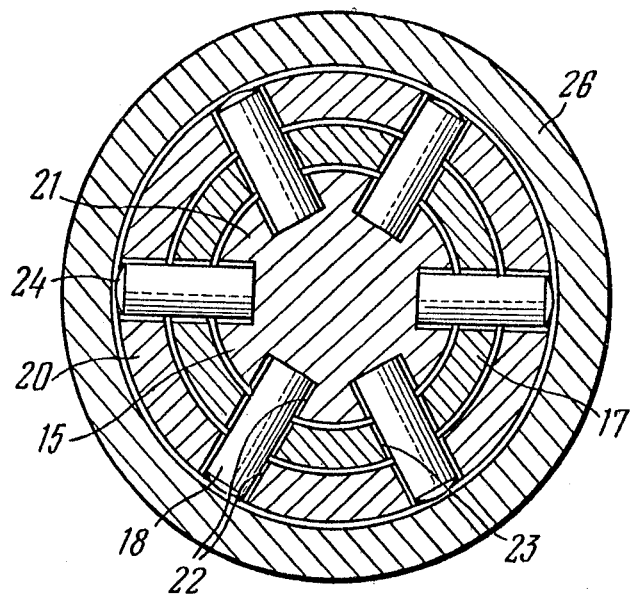
FIG.3 is a cross-section view, on an enlarged scale, taken along the lines III—III of FIG. 2.

The articulated coupling of the invention comprises two cylindrical half-couplings 15 and 16 (FIG. 2), a cage 17 in the form of a hollow cylinder, and rollers 18. The end facesof the half-couplings 15 and 16 facing each other are provided with recesses 19 in the form of cylindrical annular grooves. The recesses have external and internal walls 20 and 21, respectively, and the cage 17 is installed with clearance in the grooves of the half-couplings. Substantially coaxial radial openings 22 and 23 are formed in the external and internal walls 20 and 21 of the half-couplings 15 and 16, respectively, and in the cage 17 (FIGS. 2, 3). The rollers 18 are installed in the openings 22 and 23 with clearances so that they rest on the external and internal walls 20 and 21 of the grooves, respectively and on the cage 17, thereby effecting a kinematic connection between the half-couplings 15 and 16.

It should be noted that the clearances between the cage 17 and the walls 20 and 21 of the groove of the half-couplings, as well as between the roolers 18 and the walls of the radial openings 22 and 23 are shown in FIGS. 2 and 3 when the articulated coupling is not loaded. The values of the above-mentioned clearances are selected in accordance with the required angularity of the articulated couplings. Loading the articulated coupling by torque will cause redistribution of the aforementioned clearances, as hereinafter described.

The rollers 18 are provided with rounded ends 24 facing the periphery of the articulated coupling.

Referring now to FIG. 2, the radial openings 22 and 23 and the rollers 18 installed therein are arranged in one plane for each half-coupling 15 and 16. It will be understood by those skilled in the art that the radial openings 22 and 23 and the rollers 18 may have another arrangement in the cage 17 and the half-couplings 15 and 16 in which said radial openings in each half-coupling are arranged in two or more lateral planes or in a staggered order with the groove thereof accomodating a portion of said cage. The number of rollers 18 shown in FIG. 3 is given as an example only without restricting the invention. The number of the rollers may be greater or less than that shown in FIG. 3 and is determined in accordance with the operating conditions of the articulated coupling. It is preferred that rollers 18 be made from the material of greater hardness than the materials of the half-couplings 15 and 16 and the cage 17.

Arranged on the outside of the half-couplings 15 and 16 (FIG. 2) is a means 25 for holding the rollers 18 in the radial openings 22 and 23, provided in the form of a casing 26 installed with radial clearances relative to said half-couplings on elastic gaskets 27 and 28 disposed between the external surfaces of said half-couplings and the internal surface of said casing 26. The gaskets are set with an interference ensured by discs 29 and 30 and lock rings 31 and 32 which fix the gaskets in place. It is preferable to provide the gaskets 27 and 28 with a tapered external surface and to provide the casing 26 with respective tapered bores for ensuring the interference and simplifying the assembly and disassembly. The elastic gaskets 27 and 28 may be affixed by other methods such as, for example, by tightening with nuts on bolts.

The internal space of the articulated coupling, including all the clearances between the elements thereof, is filled with grease. The grease is prevented from leaking out of the internal space of the articulated coupling by the casing 26 and the gaskets 27 and 28. At the same time the casing 26 and the gaskets 27 and 28 prevent abrasives or drilling fluid from entering the internal space of the articulated coupling.

The center portions of the end faces of the half-couplings 15 and 16 are provided with means 33 for transmission of axial thrust from one half-coupling to the other one. The means 33 are in the form of two contacting end surfaces of the half-couplings 15 and 16, with at least one of these surfaces, for example, of the half-coupling 15, being spherical. Such an embodiment ensures rolling of the end surfaces of the half-couplings 15 and 16 during angular misalignment thereof. The radius of a sphere is chosen such that at a maximum angular misalignment of the articulated coupling the point of contact of the end surfaces is retained within the limits of the center portion of the half-couplings 15 and 16, and there is no edge contact at the boundary of the sphere and the recess 19.

The aforedescribed embodiment of the articulated coupling operates in the following manner.

The half-coupling 15 (FIG. 2) is connected at its upper end to the rotor 5 of a screw-type downhole motor, for example, through threading 34. Connected to the lower end of the half-coupling 16 through threading 35 is a connecting rod 6 which is connected at its opposite end to the lower articulated coupling 9 (FIG. 1). Both articulated couplings 7 and 9 are identical and of the construction illustrated in FIG. 2.

Under conditions of angular misalignment of the articulated coupling when said coupling transmits torque and axial thrust from the rotor 5 (FIG. 1) to the connecting rod 6, angulation of the half-couplings 15 and 16 (FIG. 2) is effected at the expense of the clearances between the cage 17 and the walls 20 and 21 of the groove, and also between the rollers 18 and the walls of the radial openings 22 and 23 of said half-couplings and said cage. As a result, the clearances are redistributed so that the rollers 18 (FIG. 4) rest on both walls 20 and 21 of the groove and on the cage 17, and have three places of contact which prevents misalignment of the rollers. As follows from the diagram of FIG. 4, the rollers 18 are loaded by forces $P_1$, $P_2$, $P_3$ acting in directions essentially coincident with the directions of perpendiculars to the places of contact. The rollers 18 are equivalent to a beam supported at both ends in symmetric bending. In consequence of an insignificant difference in the diameters of the rollers 18 and the radial openings 22 and 23, a large reduced radius of curvature is ensured in the contact thereof due to which the loads at the places of contact are decreased.

When the half-couplings 15 and 16 are engaged in oscillatory angular movements at the expense of the clearances between the external and internal walls 20 and 21 of the grooves of said half-couplings 15 and 16 and the cage 17, on the one hand, and between the rollers 18 and the walls of the radial openings 22 and 23, on the other hand, said cage is self-aligned relative to the external and internal walls of said grooves, and the rollers are also self-aligned in said radial openings of said cage and said cage 17 and the half-couplings. This provides the balancing of loads between the elements of the articulated coupling and increases the load-carrying capacity of the articulated coupling at high values of torque. When the half-couplings 15 and 16 perform oscillatory angular movements the rollers 18 roll over the walls of the radial openings 22 and 23 in said half-couplings and in the cage 17. This is beneficial for reducing the friction losses and improving reliability and durability of the articulated coupling.

The casing 26 (FIG. 2) installed on the outside of the half-couplings 15 and 16 prevents radial displacement of the rollers 18 under the action of centrifugal forces in directions away from the axis of the articulated coupling. The rounded form of the ends 24 of the rollers 18 prevents them from embedding in the internal surface of the body of the casing 26. The presence of the clearances between the external surfaces of the half-couplings 15 and 16 and the internal surface of the casing 26, and the installation of said casing on the elastic gaskets 27 and 28 provide for oscillatory angular movements of the articulated coupling. The presence of grease in the interior of the articulated coupling ensures more beneficial operating conditions for the contacting surfaces of the coupling elements.

Transmission of axial thrust acting on the articulated coupling is effected due to interaction of the end surfaces of the half-couplings 15 and 16, with at least one of these surfaces being spherical.

As a result, the rollers 18 are relieved from the action of axial thrust. When the articulated coupling performs oscillatory angular movements the relative movement of the bearing end surfaces of the half-couplings 15 and 16 comes to rolling of the sphere over the surface.

Another embodiment of the articulated coupling of the invention incorporates two cylindrical half-couplings 36 and 37 (FIG. 5), a cylindrical cage 38, and rollers 39. A recess 40 is formed in the end face of each of the half-couplings 36 and 37 so that an annular collar 41 is formed over the periphery of said half-couplings. Annular grooves 42 are formed in each end face of the cage 38 and form two walls 43 and 44 in the body of said cage 38. The collars 41 of the half-couplings 36 and 37 are disposed between the walls. Radial openings 45 and 46 (FIGS. 5 and 6) are formed in both walls 43 and 44 of the cage 38 and in the collars 41 of the half-couplings 36 and 37, respectively. The rollers 39 are installed in the radial openings 45 and 46 with clearances such that they rest on both walls of the cage 38 and on the collar 41 of the half-couplings 36 and 37.

Arranged on the outside of the half-couplings 36 and 37, and the cage 38 is a means 47 for holding the rollers in the openings. The means 47 is a casing 48 installed on elastic gaskets 49 disposed on the half-couplings 36 and 37.

The gaskets 49 are stepped bushings installed on the cylindrical portion of the half-couplings 36 and 37. Each of the elastic gaskets 49 rests on the face of the external wall 44 of the cage 38 and is affixed inside the casing 48, for example, via a washer 51 and a lock ring 52.

For taking up axial thrust between the end surfaces of the half-couplings 36 and 37, means is provided for transmitting axial thrust from one half-coupling to the other. The means is an insert 53 with spherical end surfaces which interact with the end surfaces of the center portions of the half-couplings 36 and 37.

It is preferable to make the insert of such an axial size that the contact of the end surfaces of the half-couplings 36 and 37 with the spherical surfaces of the insert 53 will occur in a plane passing through the axes of the radial openings 46 of said half-couplings 36 and 37.

Such an embodiment of the means for transmission of axial thrust is more simple to manufacture and more reliable in operation, since the insert 53 may be made from the material having the hardness greater than that of half-couplings 36 and 37.

The internal space of the articulated coupling is filled with grease retained therein by the casing 48 and elastic gaskets 49.

Figure 4:
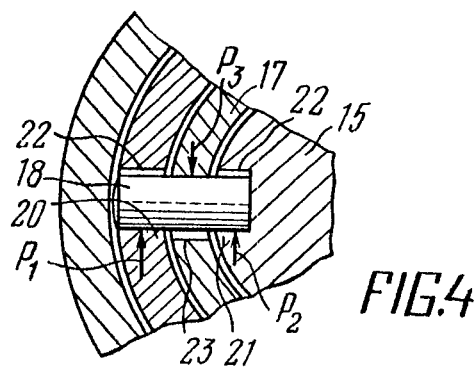
FIG. 4 is a view of a portion of the view of FIG. 2 and a diagram of forces acting on the roller.
Figure 5:
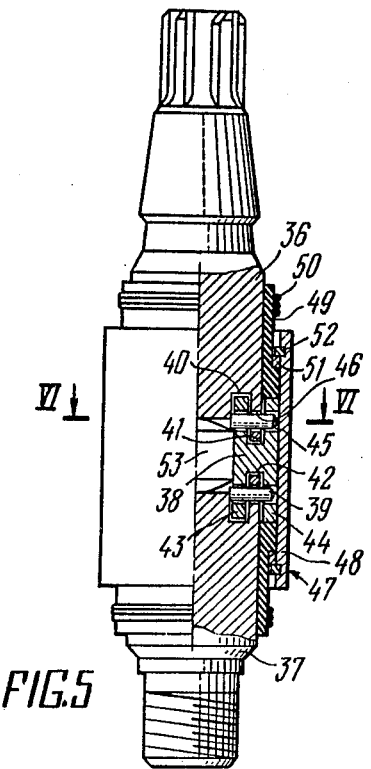
FIG. 5 is a partial longitudinal sectional view of another embodiment of the articulated coupling of the invention.
Figure 6:
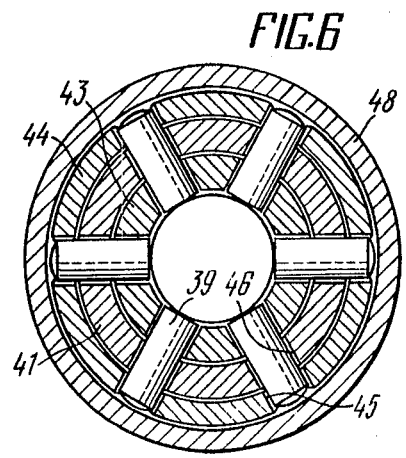
FIG. 6 is a cross-sectional view, on an enlarged scale, taken along the lines VI—VI, of FIG. 5.

An advantage of the embodiment of FIGS. 5 and 6 of the articulated coupling over the embodiment of FIGS. 2 to 4 is that the embodiment of FIGS. 5 and 6 has a greater flexibility, resulting from changes in the configuration of the elastic gaskets 49 and in the method of affixing said gaskets. This advantage is achieved at the expense of increasing the radical clearance between the internal surface of the casing 48 and the external surfaces of the half-couplings 36 and 37 due to a decrease in the outside diameter of said half-couplings, with the same overall diameter of the articulated coupling being retained without reduction in the load-carrying capacity of the coupling.

The articulated couplings of both embodiments of the invention operate in much the same way.

The rollers 39 are in contact with two walls of the cage 38 at two places and with the collar 41 of the half-coupling 36 or 37 at one place.

Thus, the articulated coupling of the invention features higher reliability and durability due to its capability of transmitting torque and axial thrust of great magnitude with minimal rolling friction losses. It will be appreciated that these advantageous qualities of the articulated coupling improve reliability and durability of the machines in which it is used. For example, the use of the articulated coupling in a screw-type downhole motor, for example, ensures a prolonged operation of the downhole motor in the bottom hole, thereby obviating the necessity for pulling up the drilling string because of a failure of the articulated joints. This results in the substantial reduction of expensive and labor-consuming tripping operations.

In addition, the expenses for repair and transportation of these machines are cut down.

The articulated coupling is simple in construction, easy to fabricate, convenient in operation and requires no qualified servicing.

The field of application of the articulated coupling is not limited by the described examples. It may be used in any machines and devices where it is necessary to connect misaligned or intersecting shafts, and especially for transmitting torque and axial thrust of great magnitude.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An articulated coupling, comprising
a first cylindrical half-coupling having an end face;
a second cylindrical half-coupling disposed substantially coaxially with said first half-coupling and having an end face facing the end face of said first half-coupling;
a first recess formed in said end face of said first half-coupling facing said second half-coupling, said first recess being shaped as a cylindrical annular groove having external and internal walls;
a second recess formed in said end face of said second half-coupling facing said first half-coupling, said second recess being shaped as a cylindrical annular groove having external and internal walls;
a hollow cylindrical cage installed substantially coaxially in said grooves of said half-couplings with a clearance from said walls of said recesses;
openings formed in said first half-coupling and passing radially through said external and internal walls of said first recess groove;
openings formed in said second half-coupling and passing radially through said external and internal walls of said second recess groove;
openings formed through said cage substantially coaxially with said openings of the first and second half-couplings;
rollers installed with a clearance in said substantially coaxial openings of said first and second half-couplings and said cage and resting on both walls of said groove and on said cage; and
means for retaining said rollers in said openings comprising a casing and elastic gaskets, said casing being mounted on said gaskets outside said half-couplings with a clearance from said half-couplings.

2. An articulated coupling as claimed in claim 1, further comprising means for transmitting axial thrust from one of said first and second half-couplings to the other provided at the center portions of said end faces of said half-couplings.

3. An articulated coupling as claimed in claim 2, wherein said means for transmitting axial thrust comprises two contacting end surfaces of said half-couplings, as least one of said end surfaces being spherical.

4. An articulated coupling, comprising
a first cylindrical half-coupling having an end face;

a second cylindrical half-coupling disposed substantially coaxially with said first half-coupling and having an end face facing the end face of said first half-coupling;

a first recess formed in said end face of said first half-coupling facing said second half-coupling, said first recess having walls and forming an annular collar over the periphery of said half-coupling;

a second recess formed in said end face of said second half-coupling facing said first half-coupling, said second recess having walls and forming an annular collar over the periphery of said half-coupling;

a cylindrical cage installed substantially coaxially in said recesses of said half-couplings with a clearance from said walls of said recesses, said cage having opposite end faces and annular grooves formed in said end faces and forming two walls between which said collars of said half-couplings are disposed with a clearance;

openings formed in said first half-coupling and passing radially through both walls of said cage and said collar of said first recess;

openings formed in said second half-coupling and passing radially through both walls of said cage and said collar of said second recess;

openings formed through said cage substantially coaxially with said openings of the first and second half-couplings;

rollers installed with a clearance in said substantially coaxial openings of said first and second half-couplings and said cage and resting on both walls of said groove and on said collar; and means for retaining said rollers in said openings comprising a casing and elastic gaskets, said casing being mounted on said gaskets outside said half-couplings with a clearance from said half-couplings.

5. An articulated coupling as claimed in claim 4, further comprising means for transmitting axial thrust from one of said first and second half-couplings to the other provided at the center portions of said end faces of said half-couplings.

6. An articulated coupling as claimed in claim 5, wherein said means for transmitting axial thrust comprises an insert installed between said half-couplings, said insert having spherical ends contacting said half-couplings.

* * * * *